United States Patent
Kramer

[11] Patent Number: 6,125,589
[45] Date of Patent: Oct. 3, 2000

[54] DEVICE FOR REDUCING FRICTION ON SLIDING GLASS

[75] Inventor: Dennis A. Kramer, Troy, Mich.

[73] Assignee: Meritor Heavy Vehicle Systems, LLC, Troy, Mich.

[21] Appl. No.: 09/466,298

[22] Filed: Dec. 17, 1999

[51] Int. Cl.[7] .................................................. E05D 13/00
[52] U.S. Cl. ................................................ 49/415; 49/374
[58] Field of Search ............................... 49/475.1, 477.1, 49/374, 414, 415, 416

[56] References Cited

U.S. PATENT DOCUMENTS

| | | | |
|---|---|---|---|
| 2,175,391 | 10/1939 | Hatossy | 49/348 |
| 3,162,281 | 12/1964 | Kraska et al. | 49/424 X |
| 4,267,668 | 5/1981 | Natinsky | 49/139 X |
| 5,771,637 | 6/1998 | Oikawa et al. | 49/416 |
| 5,812,684 | 9/1998 | Mark | 381/86 |
| 5,943,823 | 8/1999 | Yoshida et al. | 49/416 |

*Primary Examiner*—Jerry Redman
*Attorney, Agent, or Firm*—Carlson, Gaskey & Olds

[57] ABSTRACT

A window sliding mechanism such as that which is used in passenger car doors incorporates a system to reduce friction between a window and its respective seal. A channel provided with air holes is fitted along the window edges that ride within a conventional seal. Alternatively, the air holes could be provided in the seal itself. Air is supplied to the air holes by way of a reservoir or small pump attached to the window sliding mechanism. Controlled air flow reduces the friction generated during window travel. In another embodiment, the system to reduce friction is an oscillating device provided to a conventional window sliding mechanism. The oscillating device is powered by a low cost piezo device. The oscillating device would cause the window to vibrate, thereby reducing the friction generated during window travel.

14 Claims, 3 Drawing Sheets

DEVICE FOR REDUCING FRICTION ON SLIDING GLASS

BACKGROUND OF THE INVENTION

This invention relates to reducing friction on sliding glass such as windows in doors of passenger cars.

Modem vehicles typically have several windows which are moveable automatically by way of a motorized system. Each window is maintained in a respective window frame using a relatively tight seal. Due to the tight seal, movement of a window within its respective seal results in a degree of friction. The motorized system used to move or slide the window must provide sufficient force to overcome the degree of friction between a window and its respective seal.

In this application, the term "window" should be understood to include not only side windows in a vehicle, but also other moveable closures such as rear windows, sunroofs, etc.

Reducing the degree of friction would lower the force required to overcome it. That is, the amount of energy required to open or close a window would be reduced. This would allow the use of a smaller and quieter motorized system to move or slide a window within its respective seal.

In applications where reduced energy consumption is critical such a friction reduction would be desirable.

SUMMARY OF THE INVENTION

Generally, the present invention incorporates a device into a vehicle window assembly which reduces the degree of friction between a window and its respective seal.

In one diclosed embodiment of this invention the window sliding mechanism uses controlled air flow to "lubricate" window travel. This lubrication greatly reduces the degree of friction between a window and its respective seal.

In one example, the edges of a window that ride in a conventional seal are fitted with a channel containing rows of air holes. The air holes allow a controlled amount of air to escape reducing the level of friction. Air is supplied to the window sliding mechanism by way of a reservoir or small pump attached to the window within the cavity of the door, or roof, as in the case of a sunroof window. In another example of this embodiment, the air holes are formed in a modified version of the seal itself.

In another embodiment, the window sliding mechanism uses an oscillating device to vibrate the window and reduce friction during window travel. In one example of this embodiment each window is equipped with an oscillating device powered by a low cost piezo device attached to the window within the door cavity.

These and other features of the present invention can be best understood from the following specification and drawings, the following of which is a brief description.

DETAILED DESCRIPTION OF THE PREFERRED EMBODIMENT

Figure 1:
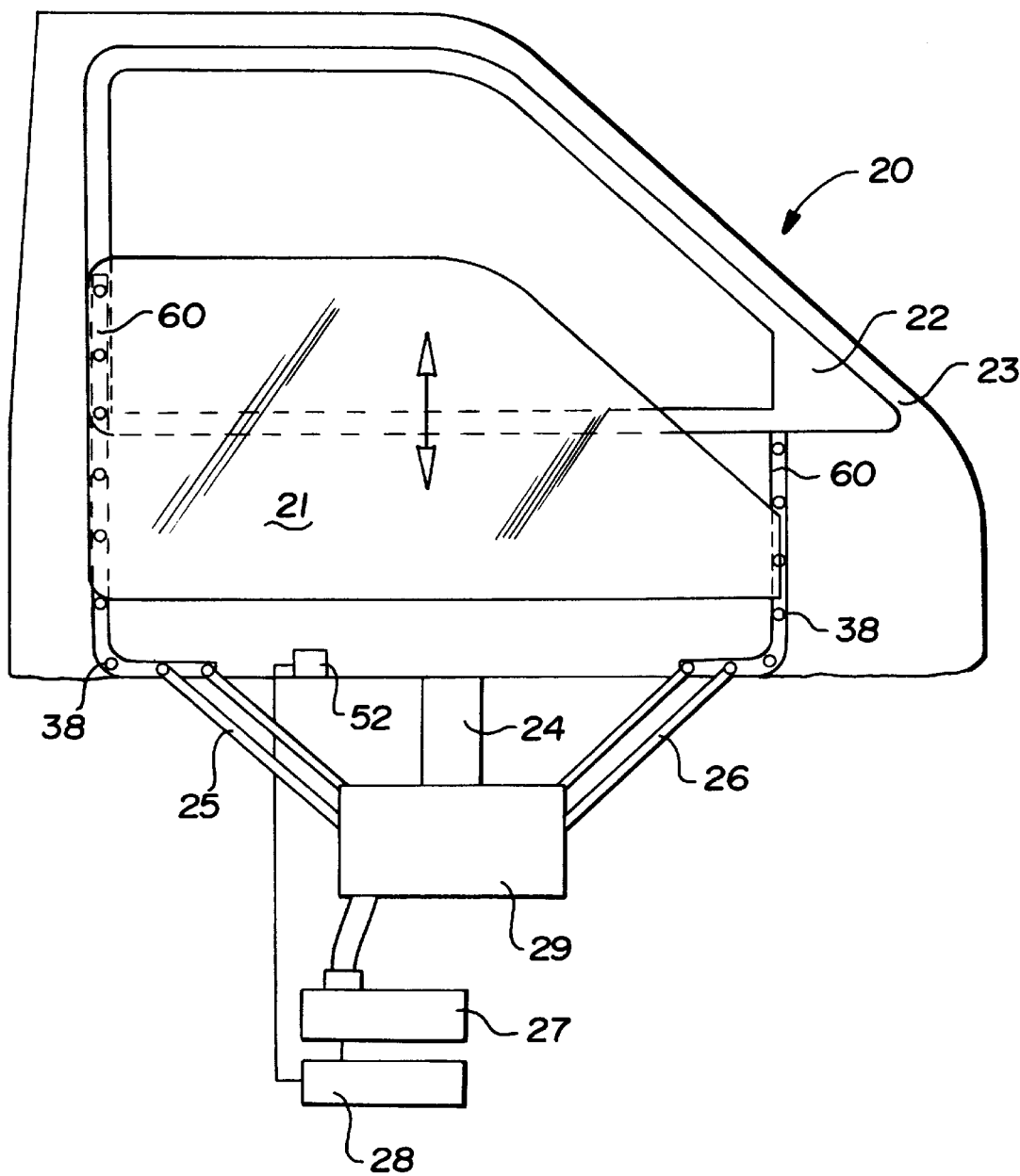
FIG. 1 is a schematic view of a window incorporating a first embodiment of the present invention.

FIG. 1 schematically shows a window sliding mechanism 20 incorporating a slideable window 21. A seal 22 surrounds the window 21. Frame 23 surrounds seal 22 and window 21. Lift mechanism 24 drives window sliding mechanism 20. Lift mechanism 24 is shown schematically and could be any type of known window lift. A motor 29 is shown schematically as part of the lift mechanism. The lift mechanism includes air supply lines 25,26, air reservoir or pump 27, and a control 28. Window 21 is provided with a channel 60 that rides within seal 22. Channel 60 includes air holes 38.

The system operates as follows. When window movement is first actuated, friction between the window and its respective seal is relatively high. At this point, control 28 receives a signal that motor 29 is to begin. Control 28 then activates air pump 27 to begin delivering air through lines 25, 26, to channel 60 and out through air holes 38. It should be understood that the window is typically tightly received in seal 22 at start up. Thus, the air provides "lubrication" to reduce the frictional load on the motor required to move the window.

Figure 2:
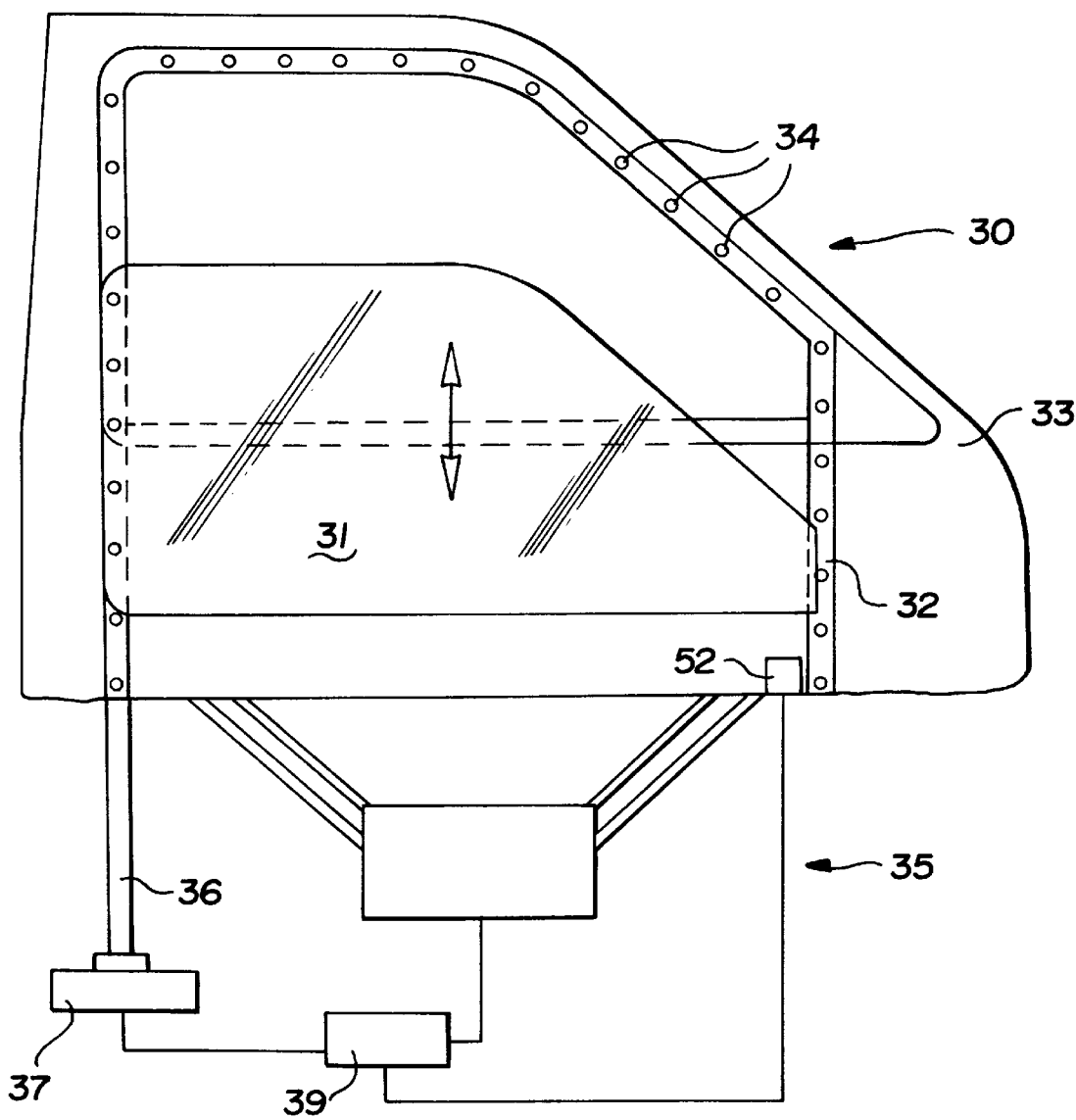
FIG. 2 shows an alternative embodiment.

FIG. 2 shows a window sliding mechanism 30 incorporating slideable window 31. A seal 32 surrounds window 31. Frame 33 surrounds seal 32 and window 31. Seal 32 includes air holes 34 at an inner surface facing window 31. Attached to window sliding mechanism 30 is lift mechanism 35 and an air supply system 36 including air reservoir or pump 37. A control 39 acts similarly to the FIG. 1 embodiment at start up.

Figure 3:
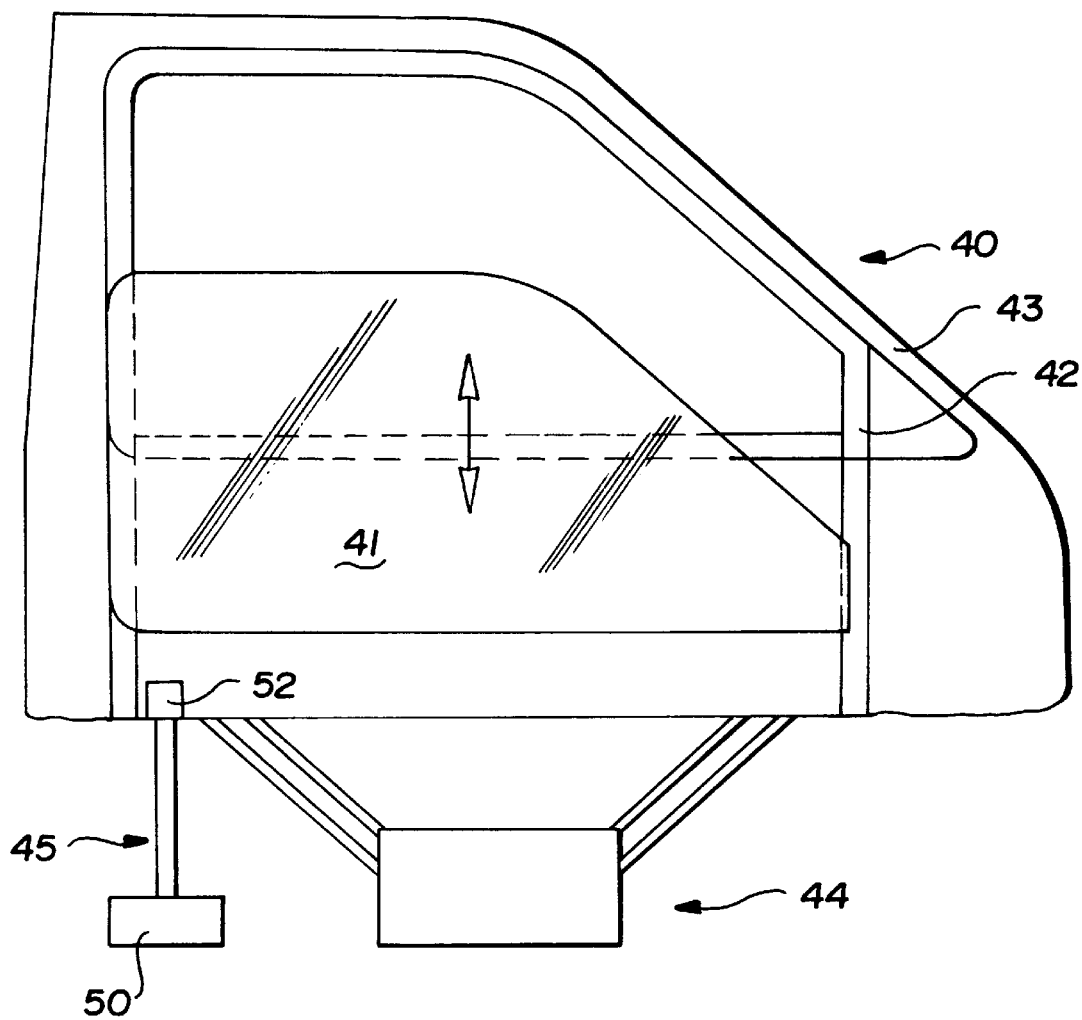
FIG. 3 shows an alternative embodiment.

FIG. 3 schematically shows a window sliding mechanism 40 incorporating slideable window 41. A seal 42 surrounds window 41. Frame 43 surrounds seal 42 and window 41. Attached to window sliding mechanism 40 is lift mechanism 44 and oscillating system 45. A control 50 controls system 45 which preferably consists of a piezo device 52 on the glass 41. The piezo device is controlled to vibrate glass 41 at start up. The vibrating glass reduces the contact between the glass and its respective seal, thereby reducing the frictional load on the motor required to move the window.

Although the oscillation system 45 and the air flow embodiments may function independently, they may also be used in combination. To this end a piezo device 52 is shown on the glass 21 and 31 of FIGS. 1 and 2 to illustrate the combined use of the systems.

Preferred embodiments of this invention have been disclosed. However, a worker of ordinary skill in this art would recognize that certain modifications would come within the scope of this invention. For that reason, the following claims should be studied to determine the true scope and content of this invention.

What is claimed is:

1. A sliding glass assembly comprising:
   a sliding glass with edges slideable within a frame;
   a seal on said frame; and
   an air flow assembly for reducing friction between said sliding glass and said frame, said air flow assembly delivering air to an interface of said seal and said glass during a glass movement cycle, and not delivering air when said glass is stationary.

2. A sliding glass assembly as recited in claim 1, wherein said frame includes a seal, and said air flow assembly has a channel fitted on said edges that slide within said seal.

3. A sliding glass assembly as recited in claim 2, wherein said channel has rows of holes and an air supply to pass through said holes.

4. A sliding glass assembly as recited in claim 3, wherein air is supplied to said holes with a pump.

5. A sliding glass assembly as recited in claim 1, wherein said frame includes a seal, and said air flow assembly has air holes within said seal, and an air supply to pass air through said holes.

6. A sliding glass assembly as recited in claim 5, wherein said air supply includes a pump.

7. A sliding glass assembly as recited in claim 1, wherein said sliding glass is a vehicle side window.

8. A sliding glass assembly comprising:

a sliding glass with edges slideable within a frame;

a seal on said frame;

an air flow assembly for reducing friction between said sliding glass and said seal;

said air flow assembly including a channel having air holes between said glass and said seal, and a supply of air to pass through said holes.

9. A sliding glass assembly as recited in claim 8, wherein said channel having air holes is located on said window.

10. A sliding glass assembly as recited in claim 8, wherein said channel having air holes is located at said seal.

11. A sliding glass assembly as recited in claim 8, wherein said supply of air includes a pump.

12. A sliding glass assembly as recited in claim 8, wherein said supply of air includes a reservoir.

13. A sliding glass assembly comprising;

a sliding glass with edges slideable within a frame;

and an oscillation mechanism which operates during a glass movement cycle to reduce friction between said sliding glass and said frame during sliding of said sliding glass, and does not operate when the sliding glass is to remain stationary.

14. A sliding glass assembly as recited in claim 13, wherein said oscillation mechanism is a piezo device.

* * * * *